(12) United States Patent
Barbour et al.

(10) Patent No.: US 8,736,670 B2
(45) Date of Patent: May 27, 2014

(54) 3D VISUALIZATION SYSTEM

(75) Inventors: Blair Allen Barbour, Madison, AL (US); David Scott Ackerson, Easton, MD (US)

(73) Assignee: Photon-X, Inc., Kissimmee, FL (US)

( * ) Notice: Subject to any disclaimer, the term of this patent is extended or adjusted under 35 U.S.C. 154(b) by 654 days.

(21) Appl. No.: 12/962,345

(22) Filed: Dec. 7, 2010

(65) Prior Publication Data

US 2011/0134220 A1     Jun. 9, 2011

Related U.S. Application Data

(60) Provisional application No. 61/267,311, filed on Dec. 7, 2009, provisional application No. 61/300,207, filed on Feb. 1, 2010, provisional application No. 61/303,077, filed on Feb. 10, 2010, provisional application No. 61/374,432, filed on Aug. 17, 2010.

(51) Int. Cl.
*H04N 13/04* (2006.01)
*H04N 13/02* (2006.01)
*G06T 15/00* (2011.01)

(52) U.S. Cl.
CPC ............ *H04N 13/0207* (2013.01); *G06T 15/00* (2013.01)
USPC ..................................... 348/44; 348/E13.075

(58) Field of Classification Search
CPC ............................ G06T 15/00; H04N 13/0207
USPC .......................................................... 348/44
See application file for complete search history.

(56) References Cited

U.S. PATENT DOCUMENTS

| | | | | |
|---|---|---|---|---|
| 4,802,759 A | * | 2/1989 | Matsumoto et al. | 356/603 |
| 5,028,138 A | * | 7/1991 | Wolff | 356/369 |
| 5,557,261 A | * | 9/1996 | Barbour | 340/580 |
| 5,890,095 A | | 3/1999 | Barbour et al. | |
| 6,671,390 B1 | * | 12/2003 | Barbour et al. | 382/103 |
| 6,788,210 B1 | * | 9/2004 | Huang et al. | 340/612 |
| 6,810,141 B2 | * | 10/2004 | Barbour | 382/154 |

(Continued)

FOREIGN PATENT DOCUMENTS

| | | |
|---|---|---|
| DE | 102004062461 A1 | 7/2006 |
| DE | 102006013316 A1 | 9/2006 |
| DE | 102006013318 A1 | 9/2006 |
| WO | 2007057578 A1 | 5/2007 |

OTHER PUBLICATIONS

L. B. Wolff and T. E. Boult, "Constraining object features using a polarization reflectance model," IEEE Trans. Pattern Anal. Mach. Intell. 13, 635-657 (1991).

(Continued)

*Primary Examiner* — Christopher S Kelley
*Assistant Examiner* — Asmamaw G Tarko
(74) *Attorney, Agent, or Firm* — Cooper Legal Group, LLC

(57) ABSTRACT

In accordance with one aspect, the present invention provides a real-time 3D visualization system. The system includes means for conveying electromagnetic energy emanating from one or more 3D surfaces including a scene and means for sensing spatial phase characteristics of the electromagnetic energy as the configuration of the 3D surfaces relative to the system changes. The system includes means for creating a 3D scene model utilizing the spatial phase characteristics sensed in a plurality of configurations and means for displaying the 3D scene model in real-time. The means for displaying includes means for synthesizing depth cues.

17 Claims, 10 Drawing Sheets

(56) References Cited

U.S. PATENT DOCUMENTS

| | | | |
|---|---|---|---|
| 6,996,339 B2* | 2/2006 | Miyoshi et al. | 396/175 |
| 8,050,491 B2* | 11/2011 | Vaidyanathan | 382/154 |
| 2002/0196415 A1* | 12/2002 | Shiratani | 353/31 |
| 2003/0133130 A1* | 7/2003 | Takahashi | 356/603 |
| 2004/0207652 A1* | 10/2004 | Ratti et al. | 345/697 |
| 2005/0013477 A1* | 1/2005 | Ratti et al. | 382/154 |
| 2005/0136819 A1* | 6/2005 | Kriesel | 452/157 |
| 2005/0163365 A1* | 7/2005 | Barbour | 382/154 |
| 2005/0275915 A1* | 12/2005 | Vesely et al. | 359/13 |
| 2008/0165185 A1* | 7/2008 | Smith et al. | 345/419 |
| 2008/0232643 A1* | 9/2008 | Leichter et al. | 382/103 |
| 2009/0167843 A1* | 7/2009 | Izzat et al. | 348/43 |
| 2009/0238449 A1* | 9/2009 | Zhang et al. | 382/165 |
| 2009/0322745 A1* | 12/2009 | Zhang et al. | 345/420 |
| 2011/0080471 A1* | 4/2011 | Song et al. | 348/46 |

OTHER PUBLICATIONS

L. B. Wolff, "Polarization-based material classification from specular reflection," IEEE Trans. Pattern Anal. Mach. Intell. 12, 1059-1071 (1990).

Atkinson, G. et al., "Recovery of Surface Orientation From Diffuse Polarization" Image Processing, IEEE Trans., vol. 15, No. 6, pp. 1653-1664, Jun. 2006.

D'Angelo, P. "3D Scene Reconstruction by Integration of Photometric and Geometric Methods," Ph.D. Thesis, University of Bielefeld, Jul. 2007.

D'Angelo, P. et al. "Image-based 3D surface reconstruction by combination of photometric, geometric, and realaperture methods." ISPRS Journal of Photogrammetry and Remote Sensing, vol. 63, No. 3, pp. 297-321, Nov. 2007.

D'Angelo, P. et al. "Image-based 3D surface reconstruction by combination of sparse depth data with shape from shading and polarisation." In: The International Archives of Photogrammetry, Remote Sensing and Spatial Information Sciences, vol. XXXVI, part 3, pp. 124-129. Symposium of ISPRS Commission III, Photogrammetric Computer Vision (PCV06), Bonn, Germany, Sep. 2006.

D'Angelo, P. et al. "3D surface reconstruction by combination of photopolarimetry and depth from defocus." In: W. Kropatsch, R. Sablatnig, A. Hanbury (eds.) Patterson Recognition. Proc. 27th DAGM Symposium, Vienna, Austria. Lecture Notes in Computer Science 3663, pp. 176-183, Springer-Verlag Berlin Heidelberg, 2005.

D'Angelo, P. et al. "3D Reconstruction of Metallic Surfaces by Photopolarimetry Analysis." In: H. Kalviainen et al. (eds.) Proc. Scandinavian Conference on Image Analysis, Joensuu, Finland. Lecture Notes in Computer Science 3540, pp. 689-698, Springer-Verlag Berlin Heidelberg, 2005.

Ikeuchi, K. "Determining surface orientations of specular surfaces by using the photometric stereo method," IEEE Trans. Pattern Anal. Mach. Intell. 3, 661-669 (1981). vol. 19, No. 4/ Apr. 2002/J. Opt. Soc. Am. A 693.

Lundberg, A. et al. "New Perspectives on Geometric Reflection Theory From Rough Surfaces." ICCV 2001: 225-232.

Shibata, T. et al. "Creating Photorealistic Virtual Model with Polarization Based Vision System," in Emanatings of SPIE (Polarization Science and Remote Sensing II, Part of SPIE's International Symposium on Optics and Photonics 2005), vol. 5888, pp. 25-35, San Diego, CA USA, Aug. 2005.

Morel, O. et al. "Active Lighting Applied to 3D Reconstruction of Specular Metallic Surfaces by Polarization Imaging,".

Miyazaki, D. et al. "Polarization-based Inverse Rendering from a Single View" Emanatings of the Ninth IEEE International Conference on Computer Vision, 2003.

Miyazaki, D. et al. "Determining surface orientations of transparent objects based on polarization degrees in visible and infrared wavelengths," Journal of Optical Society of America A, vol. 19, No. 4, pp. 687-694, Apr. 2002.

Meriaudeau, F. et al. Polarization imaging for industrial Inspection, Proc. SPIE 6813, pp. 681308 (2008).

Morel, O. et al. "Measurement of the Three-Dimensional Mirror Parameters by Polarization Imaging applied to Catadioptric Camera Calibration," J. Electron. Imaging, vol. 17, 031105, 2008.

Morel, O. et al. "Active Lighting Applied to Shape from Polarization," Image Processing, 2006 IEEE International Conference on Publication Date: Oct. 8-11, 2006.

Saito, M. et al. "Measurement of surface orientations of transparent objects by use of polarization in highlight," J. Opt. Soc. Am. A/ vol. 16, No. 9/Sep. 1999.

Rahmann, S. "Polarization images: a geometric interpretation of shape analysis," in Emanatings of International Conference on Pattern Recognition (IEEE Computer Society, Los Alamitos, Calif., Sep. 2000), pp. 542-546.

Shibata, T. et al. "Creating Photorealistic Virtual Model with Polarization Based Vision System," Proc. SPIE (Polarization Science and Remote Sensing II, Part of SPIE's International Symposium on Optics and Photonics), vol. 5888, pp. 25-35, Aug. 2005.

Gruev, V. et al. "Fabrication of a Dual-Tier Thin Film Micro Polarization Array" Departmental Papers (ESE) (Apr. 2007).

Atkinson, G. Ph.D. Thesis: Specular Surface Reconstruction From Images, May 2007.

Atkinson, G. et al. "Shape from Diffuse Polarisation," BMVC, Sep. 2004.

International Search Report issued Aug. 18, 2011.
International Search Report Dated Jul. 4, 2013.

* cited by examiner

FIG 8A  FIG 8B

ID VISUALIZATION SYSTEM

3D VISUALIZATION SYSTEM

RELATED APPLICATIONS

The present application claims benefit of priority of the following provisional patents, the disclosures of which are incorporated herein by reference:
U.S. Patent Application No. 61/267,311, filed Dec. 7, 2009,
U.S. Patent Application No. 61/300,207, filed Feb. 1, 2010,
U.S. Patent Application No. 61/303,077, filed Feb. 10, 2010, and
U.S. Patent Application No. 61/374,432, filed Aug. 17, 2010.

FIELD OF THE INVENTION

The present invention relates to the field of three-dimensional video, particularly high-fidelity three-dimensional video for applications including broadcasting, cinematography, gaming, home & business video, and conferencing.

BACKGROUND OF THE INVENTION

Discussion of Prior Art

A review of the literature reveals related approaches and art which are discussed below. Within the discussion it should be noted that SPI Cameras are 3D cameras that sense spatial phase characteristics; and SfP is an acronym for Shape from Phase or Shape from Polarization, which refers to a technology for determining shape from the phase state (or polarization state) of electromagnetic energy scattering off of an object surface.

SPI/SfP Patents

The Wolff patent, U.S. Pat. No. 5,028,138, discloses basic SfP apparatus and methods based on specular reflection. Diffuse reflections, if they exist, are assumed to be unpolarized. The first Barbour patent, U.S. Pat. No. 5,557,261, discloses a video system for detecting ice on surfaces such as aircraft wings based on polarization of electromagnetic energy, but does not disclose a SfP method. The second Barbour patent, U.S. Pat. No. 5,890,095, discloses a SPI sensor apparatus and a micropolarizer array. The third Barbour patent, U.S. Pat. No. 6,671,390, discloses the use of SPI cameras and methods to identify and track sports equipment (such as soccer balls) and participants on an athletic field based on integrating polarization sensitive materials into clothing and equipment. The fourth Barbour patent, U.S. Pat. No. 6,810,141, discloses a general method of using an SPI sensor to provide information about objects, including information about three dimensional geometry. The first d'Angelo patent, DE102004062461, discloses apparatus and methods for determining geometry based on shape from shading (SfS) in combination with SfP. The second d'Angelo patent, DE102006013316, discloses apparatus and methods for determining geometry based on SfS in combination with SfP and a block matching stereo algorithm to add range data for a sparse set of points. Finally, the Morel patent, WO 2007057578, discloses a fairly specialized apparatus for SfP of highly reflective objects.

SfP Publications

There are quite a few publications that describe SfP methods, some of the more relevant of which will be briefly summarized here. The Koshikawa paper, "A Model-Based Recognition of Glossy Objects Using Their Polarimetrical Properties," is generally considered to be the first paper disclosing the use of polarization information to determine the shape of dielectric glossy objects. Later, Wolff showed in his paper, "Polarization camera for computer vision with a beam splitter," the design of a basic polarization camera. The Miyazake paper, "Determining shapes of transparent objects from two polarization images," develops the SfP method for transparent or reflective dielectric surfaces. The Atkinson paper, "Shape from Diffuse Polarization," explains the basic physics of surface scattering and describes equations for determining shape from polarization in the diffuse and specular cases. The Morel paper, "Active Lighting Applied to Shape From Polarization," describes an SfP system for reflective metal surfaces that makes use of an integrating dome and active lighting. The d'Angelo Thesis, "3D Reconstruction by Integration of Photometric and Geometric Methods," describes an approach to 3D reconstruction based on sparse point clouds and dense depth maps.

SUMMARY OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a real-time 3D visualization system. The system includes means for conveying electromagnetic energy emanating from one or more 3D surfaces included by a scene and means for sensing spatial phase characteristics of the electromagnetic energy as the configuration of the 3D surfaces relative to the system changes. The system includes means for creating a 3D scene model utilizing the spatial phase characteristics sensed in a plurality of configurations and means for displaying the 3D scene model in real-time. The means for displaying includes means for synthesizing depth cues.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 8A is a conventional photograph showing a hiker on a precipice;

FIG. 8B is a segmented 3D scene model of the scene shown within FIG. 8A;

DESCRIPTION OF EXAMPLE EMBODIMENTS

Glossary of Terms

Figure 1:
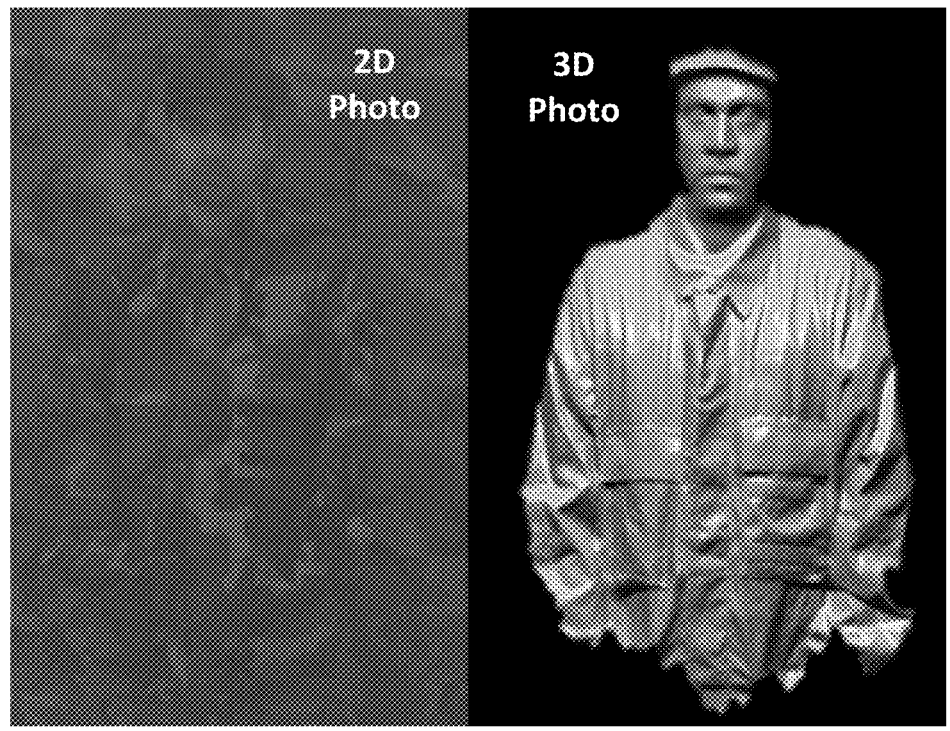
FIG. 1 are two similar photographic type images, but the right image shows 3D contrast achievable in accordance with an aspect of the present invention.

For ease of reference, the following term definitions are provided:

Characteristic. Denotes an attribute of our physical world such as temperature, color or emotional state that is representable by a model or as a notion. Whether the term applies to a physical attribute, a model, a notion or a combination of the three is usually clear by the context in which it is used.

2D/Stereo/3D Camera. A 2D camera senses characteristics (such as color) across the camera axis, but not along the camera axis (i.e. not in depth). The digital and video cameras that are part of our daily lives are 2D cameras. Stereo cameras capture two 2D images which are observed by human eyes (one image per eye) and processed by our brains to create a notion of a 3D space. 3D cameras sense characteristics across and along the camera axis and create a model of a 3D space.

2D/Stereo/3D Display. The nominal properties of light at a pixel in a 2D display do not vary with viewing angle. A stereo display in some way multiplexes two 2D displays so that each eye receives a disparate 2D image. 3D displays have some ability to vary properties of light color at a pixel as viewing angle is changed.

Display. Denotes an apparatus that enables observers to see (with their eyes) characteristics of surfaces. To display denotes to cause the apparatus to enable people to see characteristics.

Model. Denotes a tangible representation of something real. Models exist in the physical world and can be, for example, mechanical (e.g. an airplane model), electrical (e.g. a signal), mathematical (e.g. an equation), semantic (e.g. words), digital (e.g. a file included of bits), or visual (e.g. a photo).

Location. Denotes the position and orientation of a physical object relative to some other physical object. To locate denotes to determine or to adjust the position and orientation of an object. The location of a person's face might, for example, be represented in a digital model in terms of three translations and three rotations relative to a reference coordinate frame.

Notion. Denotes a conceptual representation of something real. Notions exist in the mind of a human being and can represent many things including 3D spaces.

Real-time. Denotes that characteristics of a physical 3D surface are sensed, displayed and perceived by a human without being perceptively slowed or delayed.

Sensor. Denotes a device that creates one or more characteristics (models) that represent one or more characteristics (physical attributes). A digital temperature sensor, for example, senses physical temperature and creates characteristics (e.g. bits that represent the temperature).

Spatial Phase Characteristics. Denotes characteristics of a beam of electromagnetic energy. One example type of spatial phase characteristics include those that quantify its polarization state. Stokes parameters typically represented by the symbols $S_0$, $S_1$, and $S_2$, are for example, spatial phase characteristics.

Surface. The boundary between regions in 3D space with different indices of refraction representable using characteristics such as color, shape, and location. A surface element is a very small area on a surface that can be represented, for example, by a small planar patch.

Overview

This application will teach those skilled in the art to build a new type of 3D video system resembling conventional 2D video cameras in size, operation, and cost, but capturing everyday scenes with true 3D fidelity rivaling that of human beings. One of many teachings is a real-time modeling approach for utilizing dynamically sensed spatial phase characteristics to represent everyday scenes. In somewhat more mathematical terms, the teaching is to utilize spatial phase characteristics sensed as the scene is changing to simultaneously a) build surfaces of different morphologies (rigid, deformable and particle) and b) determine camera locations. Spatial phase characteristics have properties that are very different from conventional intensity characteristics (most notably in that they enable direct determination of orientation), making scene modeling approaches easier and different in many respects from conventional algorithms and approaches in computer vision. One exemplary embodiment is disclosed in this application: a 3D thermal video system. Before describing the embodiment, we will briefly explain the benefits of 3D video in general, market needs relative to 3D video, and potentially competitive 3D video technologies.

Benefits of 3D Video 3D video offers two benefits over 2D video: human-fidelic visualization (completely realistic display) and improved visual intelligence (automated vision).

Human-Fidelic Visualization.

When a system can create a visual notion of a scene in the mind of a human that is as realistic or almost as realistic as viewing the scene directly, we say that the visualization system is human-fidelic. An imaging system has to be 3D to be human-fidelic, since human sight is 3D. But, there's more to human-fidelic than 3D . . . the display must also be very high resolution, fast (video). The invention disclosed in this patent enables human fidelic visualization.

Visual Intelligence.

Figure 2:
FIG. 2 is a photograph showing depth ambiguity, which can be avoided in accordance with an aspect of the present invention.

Visual intelligence means sensing and analyzing light to understand the state of the physical world. Automatic recognition of human emotions, gestures, and activities represent examples of visual intelligence. 2D video cameras struggle to provide a high level of visual intelligence because they throw away depth information when a video is captured. As a consequence of neglecting depth, 2D images of 3D scenes are inferior to 3D images. FIG. 1 and FIG. 2 illustrate this point. FIG. 1 shows two photos of a man in camoflage against a camoflaged background under poor lighting conditions. The photo on the left is captured with a 2D camera. The photo on the right is captured with a 3D camera. The 3D camera obviously sees the man much more clearly than the 2D camera, because the sensed shape of the man easily differentiates him from the background in this particular case where color intensity does not. 3D images have getter contrast (the ability to distinguish between different objects). FIG. 2 shows a photo of two Eiffel Towers that appear to be approximately the same size our mind tells us that the tower being held by the man is smaller than the tower on the right, but one cannot establish size for certain in 2D images. One may think that the FIG. 1 and FIG. 2 photos are contrived, but real video of real scenes typically contains dozens of instances where contrast and depth ambiguity make it difficult for automated systems to understand the state of the scene.

3D Video Market Needs 3D video cameras do everything that 2D cameras do, but add the benefits just discussed. It is reasonable to assume that global production of most cameras will shift to 3D if and when 3D cameras become cost effective. However, the market will require the following before such a shift occurs:

Compactness.

The physical size of the 3D Visualization Systems must be similar to that of comparable 2D video cameras. The digital size of 3D video data must be small enough to enable storage on reasonably sized media and transfer in reasonable intervals of time.

Visual Fidelity.

Visual fidelity today must be at least comparable to that of human eyes in all three dimensions.

Simple Operation.

The process of recording a 3D video must be as simple as recording a 2D video.

Low Cost.

Costs of 3D video equipment must be similar to that of 2D video equipment for corresponding applications and manufacturing volumes.

Competitive Technologies

Figure 3:
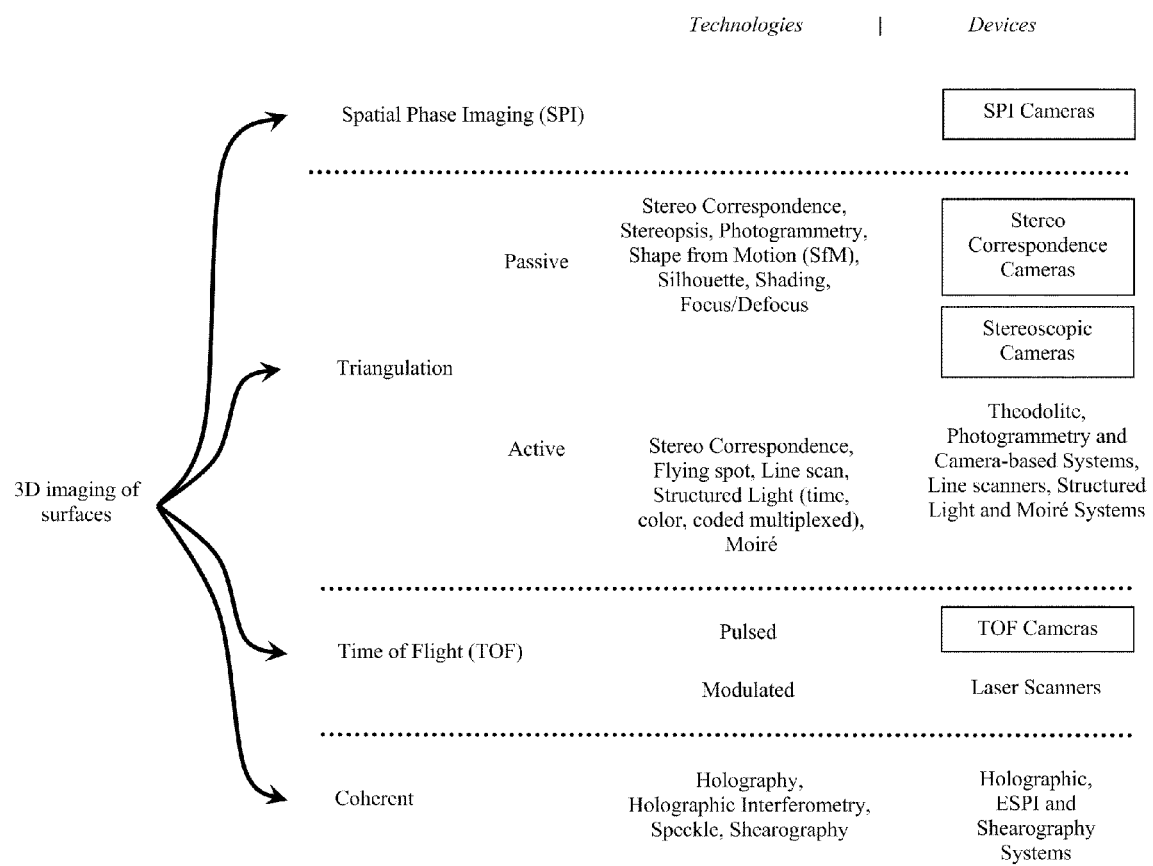
FIG. 3 is a chart showing comparisons among 3D imaging technologies including technology in accordance with the present invention.

FIG. 3 classifies 3D surface imaging technologies in terms of four broad categories: Spatial Phase Imaging (SPI), Triangulation, Time of Flight (TOF) and Coherent approaches. Spatial Phase Imaging, which includes aspects of the present invention, generally relies on the polarization state of light as it emanates from surfaces to capture information about the shape of objects. Triangulation employs the location of two or more displaced features, detectors, and/or illuminants to compute object geometry. Two important triangulation subcategories are stereo correspondence (STC) and stereoscopy (STO). Stereo correspondence cameras determine the location of features in a scene by identifying corresponding features in two or more offset intensity images using 3D geometry to compute feature locations. Stereoscopic cameras rely on human biological systems (eyes, brain) to create a notion of a three dimensional scene from two images taken from different vantage points and projected into the eyes of a viewer. Finally coherent methods rely on a high degree of spatial and/or temporal coherence in the electromagnetic energy illuminating and/or emanating from the surfaces in order to determine 3D surface geometry.

Within the broad 3D imaging categories, there are several video technologies that directly or indirectly compete with SPI: stereoscopic imaging (STO), stereo correspondence (STC) imaging and Time of Flight (TOF) imaging. Rigorous comparisons are beyond the scope of this application. Suffice it to say that each of the competing technologies fails to satisfy customer requirements in the large un-served markets discussed above in at least one important way.

Stereoscopic Imaging (STO).

Stereoscopic imaging systems rely on humans to generate a notion of 3D space. No 3D scene model is actually created. No 3D editing or analytical operations are possible using STO and automation is impossible (by definition . . . a human being is in the loop).

Stereo Correspondence (STC).

Stereo correspondence cameras fail the visual fidelity requirement, since they can only determine point coordinates where unambiguous contrasting features (such as freckles) can be observed by two cameras. Large uniform surfaces (e.g., white walls) which can be reconstructed using embodiment cameras and systems cannot be reconstructed using STC.

Time of Flight (TOF).

Time of flight cameras fail the visual fidelity requirements in two ways. First, TOF resolution is relatively poor. The best TOF lateral and depth resolutions (since we are focused on cameras, we are considering large FPAs) are currently about 1 cm, which are, respectively, one or two orders of magnitude more coarse than required for the un-served markets like those mentioned above. Second, TOF cameras cannot capture common scenes that include objects as vastly different depths. For example, it is not practical to record scenes including faces and mountains at the same time.

First Embodiment

The first embodiment, aspects of which are schematically depicted in FIGS. 4A through 9, is a passive 3D thermal camera. This embodiment represents a useful device for military personnel and firemen, among others. It is described, in part, to emphasize the fact that new apparatus do not need to benefit from visible light or conventional computer vision algorithms which rely on intensity contrast (freckles, spots, colors). Rather new algorithms based entirely on physical texture (crevices, bumps, form) form the basis of the algorithms used by the first embodiment. The primary benefit of a thermal camera is that images can be formed in the complete absence of visible light. Thus, thermal cameras enable people to "see" in the dark. This is because objects at or near room temperature strongly emit electromagnetic energy (like "light bulbs") in the infrared (IR) spectral range. There are other benefits to thermal cameras which depend on wavelength. For example, thermal images at longer wavelengths "see" through smoke and fog. However, IR images suffer from poor contrast under certain circumstances. During dawn and dusk, or after heavy rain, for example, IR image contrast can be low. This is because temperatures and/or emissivities of objects are similar. As has been explained, new apparatus in general and the first embodiment system can "see" using shape (3D contrast) alone.

Referring to FIGS. 4 and 5, the 3D thermal camera 401 might resemble, for example, a night vision monocular in appearance and operation. The 3D thermal camera 401 senses phase characteristics of electromagnetic (EM) energy 403A emanating from surface element 407 of surface 405, via conveying foreoptics 409, to a sensing means 443 including phase characteristic sensing means 411 and location sensing means 417. The 3D thermal camera 401 also senses phase characteristics of electromagnetic energy 403B emanating from spatial phase characteristic tag 425 on surface 405, via foreoptic conveyance 409, to a to a sensing means 443 including phase characteristic sensing means 411. The sensed phase characteristics 411 and the location characteristics 417 are made available via a data bus 443 to processing means 429 for use by 3D scene model means 421 and by tag reading means 423. 3D scene model means 421 determines the shape location and size of surface 405. The 3D scene modeling means 421 also uses location and encoded information in SPI tag 425, to create a 3D scene model 427 of the surface 405. Display means 435 renders the 3D scene model 427 using depth cues that enable humans to perceive that spatial nature of surface 405. Many of the aforementioned entities will be discussed in more detail in paragraphs below.

The boxed and circled elements shown in FIG. 4 within the 401 boundary are physically contained within the body of the 3D thermal camera 401. However, it is to be appreciated that it is not necessary that the boxed and circled elements be physically enclosed within the body of the 3D thermal camera 401. For example, in other embodiments certain processing means such as the 3D scene modeling means 421 might be located in one or more separate enclosures that might, for example, be tethered, or wirelessly connected with other elements of the 3D thermal camera 401.

Although the example is presented as a thermal camera, it is to be appreciated that the camera may also be non-thermal or a camera using both thermal and non-thermal characteristics. Drawing elements in these figures that are dashed are discussed in the specification, but are not necessarily used in one or both embodiments.

3D Scene Modeling

Figure 4A:
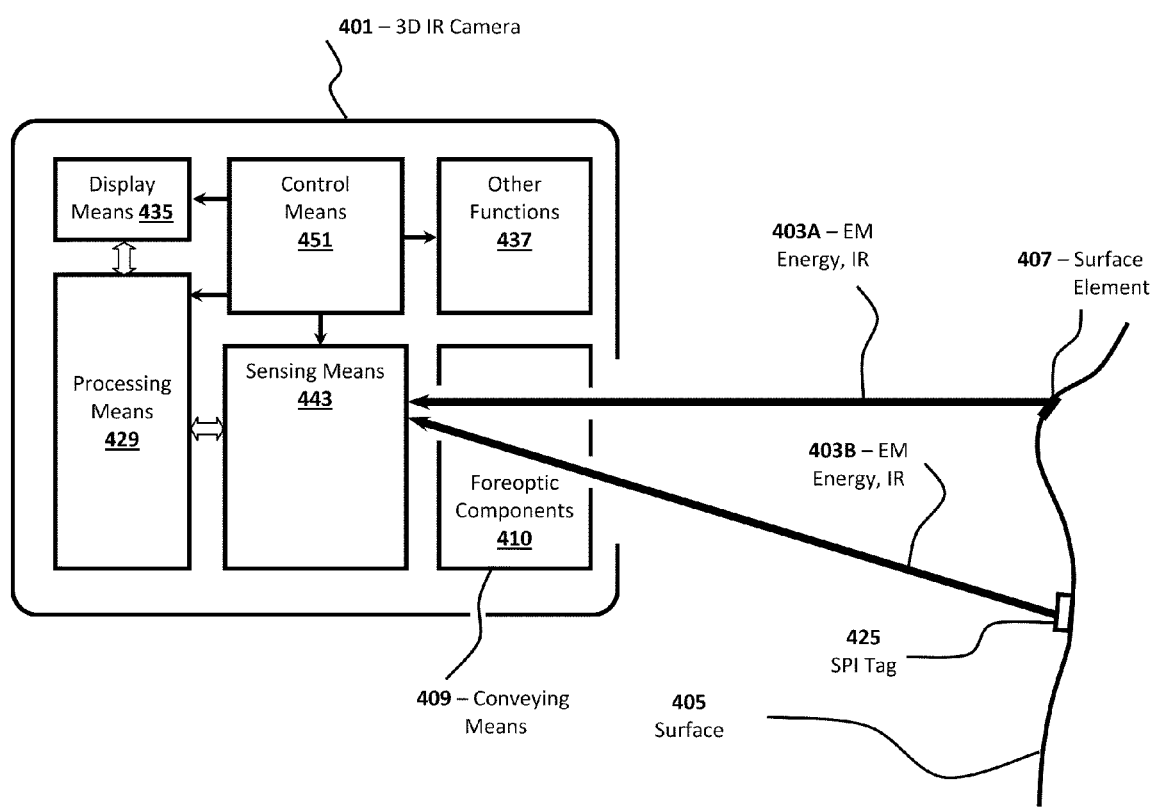
FIG. 4A is a schematic representation of an example 3D camera, in accordance with an aspect of the present invention and at a high level.
Figure 4B:
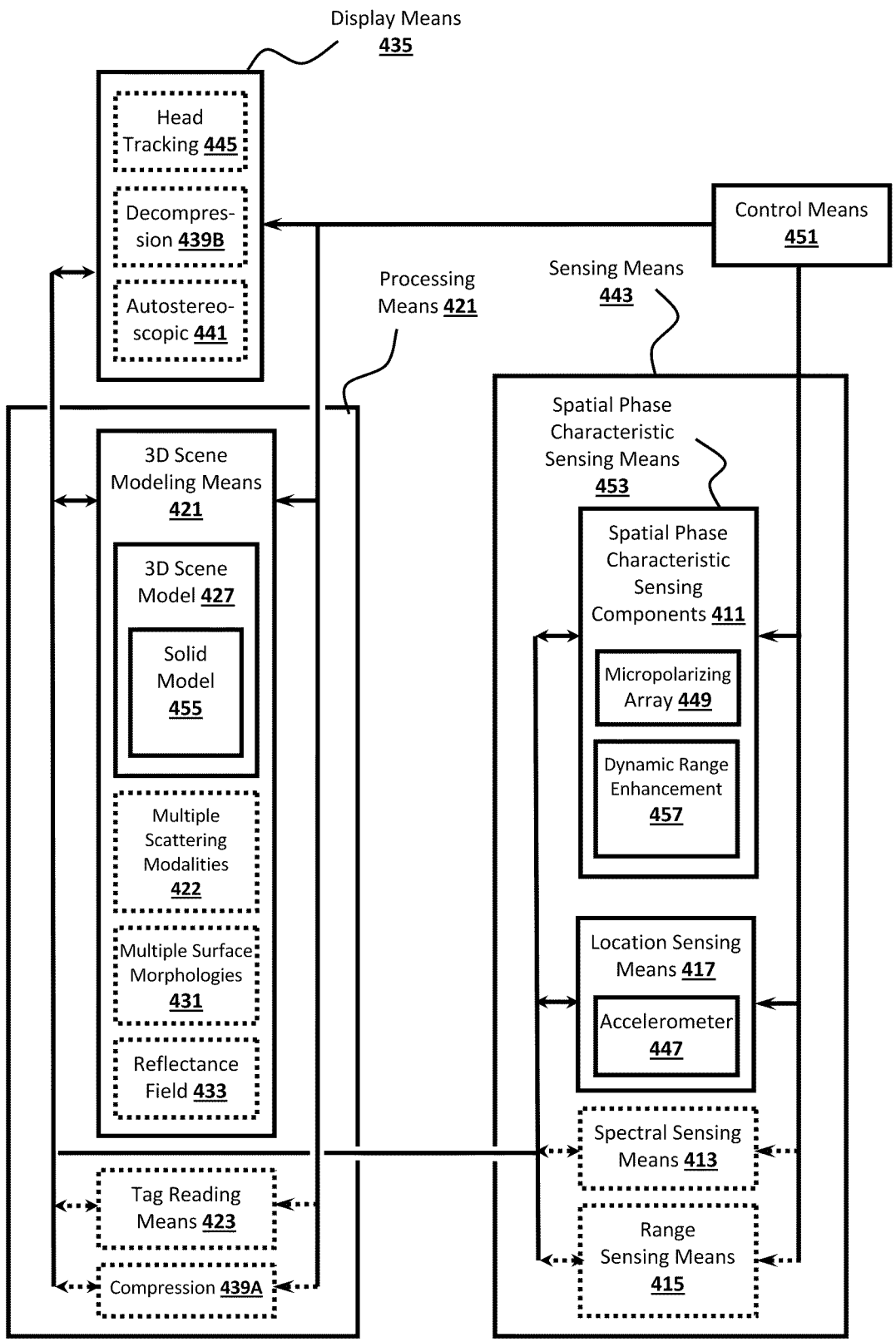
FIG. 4B is a schematic representation of example details of a portion of the 3D Camera of FIG. 4A, which includes sensing means, processing means and display means.

Referring to FIG. 4A, the first embodiment camera 401 includes the processing means 429. Referring to FIG. 4B, the processing means 429 includes the 3D scene modeling means 421 that further includes: the 3D scene model 427, the means for determining surface element orientations from multiple scattering modalities 422, the means for creating surfaces that have different morphologies 431, and the means for creating the reflectance field. The first embodiment camera 401 3D scene model 427 includes a solid model 455.

Overview.

Figure 6:
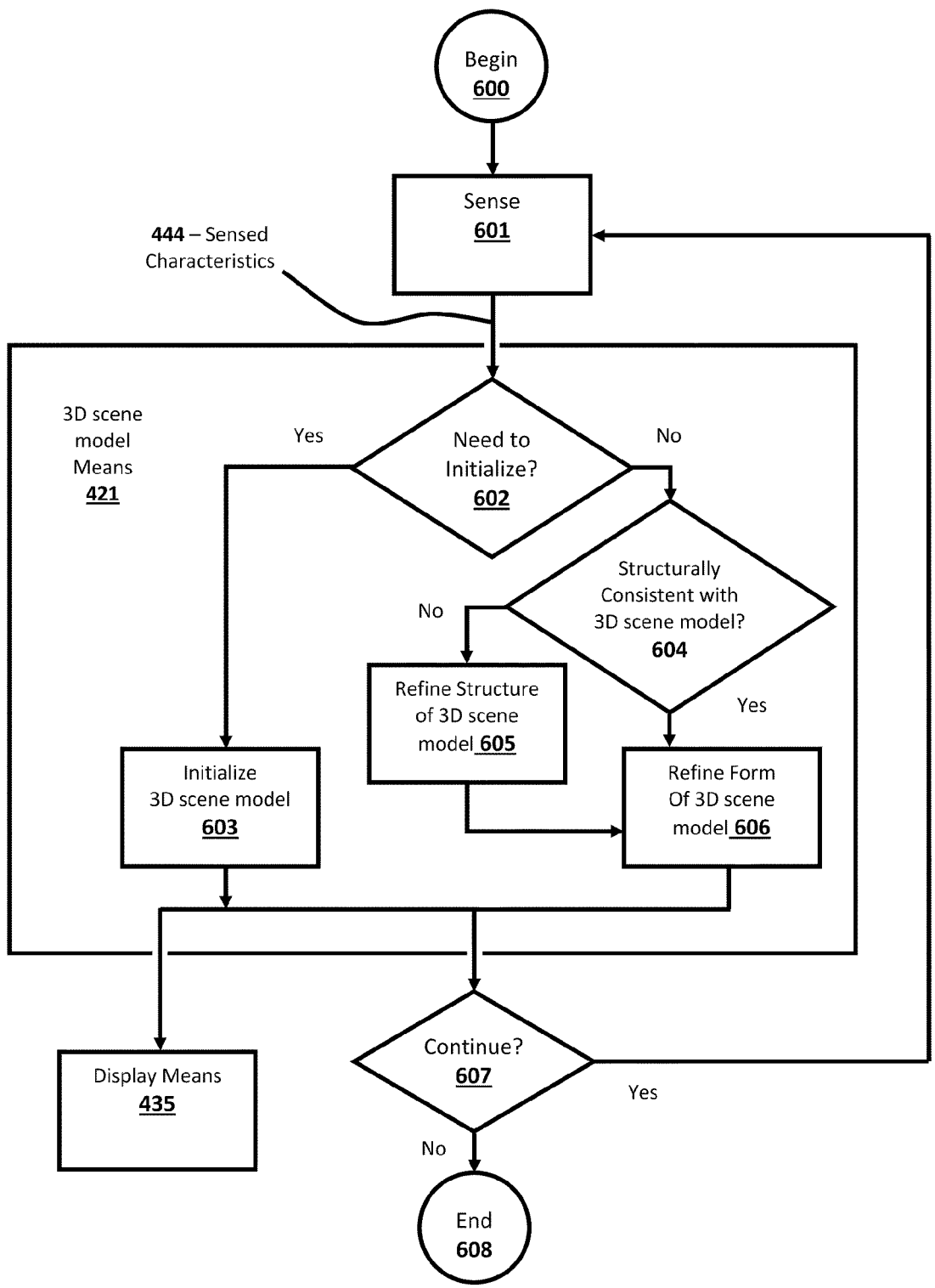
FIG. 6 is an example 3D Scene Modeling Means Flowchart for a 3D camera.

The 3D scene modeling process is schematically described in FIG. 6. The basic steps involved in creating the 3D scene model other than beginning 600 and ending 607 are sensing 601 under which step scene characteristics are created, initialization 602 and 603 under which steps the scene model is initialized if required and refinement 604, 605, and 606, under which steps the scene model is refined. The model is periodically rendered by the Display Means 435. The scene model is periodically refined 607.

Sensing.

The first embodiment modeling process is described in FIG. 6. The 3D scene modeling process, including initialization or refinement, begins with a sense operation 601 initiated when control means 451 triggers spatial phase characteristic sensing means 453 and location sensing means 417. Sensed characteristics 444 are created that include three spatial phase characteristics per camera 401 pixel and six camera acceleration characteristics including three translations and three rotations.

Initialization.

If initialization is required 601, the initialization step will be accomplished. The 3D scene model 427 needs to be initialized 603 when, for example, the camera 401 is first sensing a new scene and therefore creating the first set of sensed characteristics 444. Spatial phase characteristics 444 are utilized to determine surface element orientations associated with each pixel in the camera 401 using the spatial phase imaging equations described above. Normal vectors are utilized to represent surface element orientations. The normal vectors are spatially integrated and segmented to create one or more 3D surfaces 405. By default, the morphology of each 3D surface 405 is set to rigid. The dense field of orientation vectors provides high probability means for segmentation. Shape boundaries between surfaces are unaffected by changing illumination, for example, the way that intensity features change. Most natural objects will exhibit a dense set of near 90 degree normal vectors (with respect to the camera 401 axis) on the occluding boundaries. It is to be appreciated that other sensed characteristics, such as spectral characteristics, can be used in combination with normal vectors to segment the one or more 3D surfaces 405.

The photographs in FIG. 7 are illustrative of the initialization process. FIG. 7A depicts a visible light photo of a woman's face. (In FIGS. 7A, B, and C, background surfaces have been removed for clarity). FIG. 7B depicts normal vectors over the face after surface integration. FIG. 7C depicts a 3D scene model created from a single frame of data utilizing a spatial phase characteristic sensing IR camera. Since the first embodiment camera 401 includes a nominally flat focal plane array, the 3D surfaces created from the first frame of spatial phase characteristics after surface integration have the proper shape, but the relative distances between surfaces cannot be determined.

Figure 7A:
FIG. 7A is a conventional photograph of a woman.
Figure 7B:
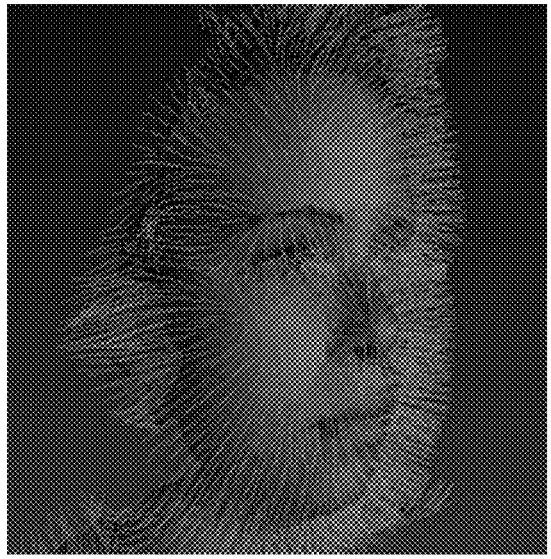
FIG. 7B is a 3D scene model of the woman shown within FIG. 7A depicting normal vectors.
Figure 7C:
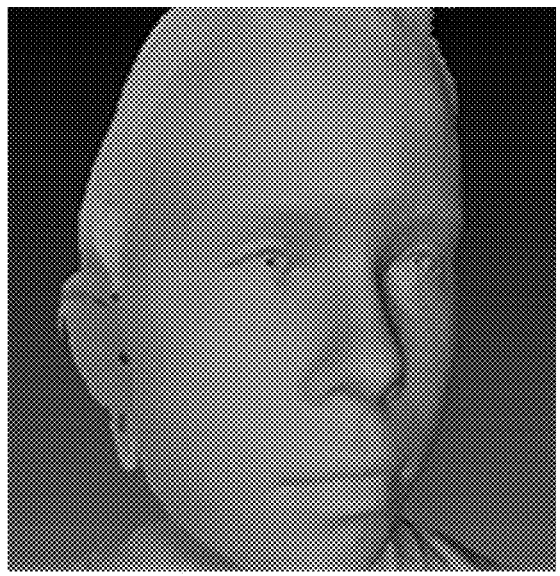
FIG. 7C is a 3D scene model of the woman shown within FIG. 7A.
Figure 7D:
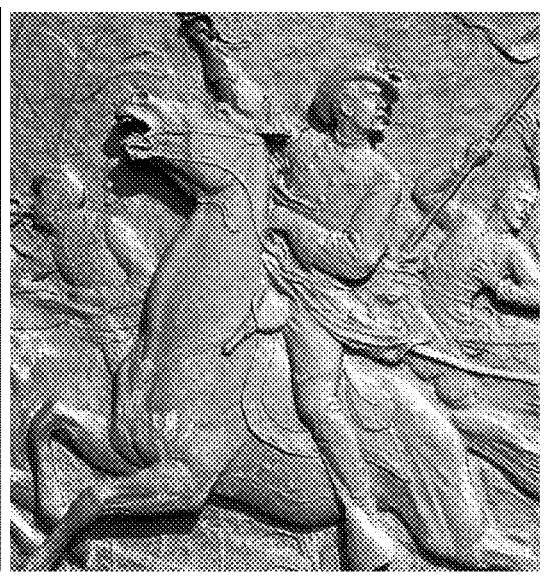
FIG. 7D is a photograph of a bas-relief sculpture.

The surface model created during the initialization process of the first embodiment is similar to the bas-relief sculpture illustrated in FIG. 7D and will hereinafter be referred to as a bas-relief model. The one or more surfaces 405 that comprise the 3D scene model 427 have 3D shape, but the relative location in depth of the 3D shape and depth cannot be determined without relative motion.

It is to be appreciated that a spatial phase characteristic sensing means 453 can be configured to enable surface elements 407 to be simultaneously sensed from a plurality of directions. This can be accomplished, for example, by locating a plurality of conveying means 409 and sensing means 443 and in close proximity on a planar frame, or by locating a plurality of conveying means 409 and sensing means 443 on the inside surface of a hemisphere. In this case, the initial surface would not a bas-relief model, but rather would be a fully developed 3D scene model. The initialization process in this case would determine the correspondence of features of form (3D textures as opposed to contrast textures) in order to determine the form and structure of the 3D scene model 427.

It is to be appreciated that other information such as the approximate size of objects including faces or other sensed information, including depth from focus or defocus, provides enough information that a fully developed 3D scene model can be created on initialization.

The 3D scene model 427 has certain structural characteristics such as surface 405 boundaries and certain form characteristics such as surface 405 shape, size, and location.

Refinement.

Additional frames of sensed characteristics 444 can be processed by the 3D scene modeling means 421 including steps 601 and 607 to refine the 3D scene model 427. If no relative motion occurs between the camera 401 and the one or more surfaces 405, characteristics can be averaged to reduce 3D scene model errors thereby improving the 3D scene model 427. If relative motion occurs, additional refinement of the structure at step 605 and/or additional refinement of the form at step 606 of the 3D scene model 427 by the 3D scene modeling means 421 can be accomplished.

The first embodiment camera 401 senses relative motion in two ways: via changes in spatial phase characteristics 411 and via changes in six camera acceleration characteristics. When sensing rigid and stationary surfaces (that would typically comprise, for example, the background of a scene) these two sources of relative motion sensing are redundant and can be utilized for real-time calibration and for segmentation.

Figure 8C:
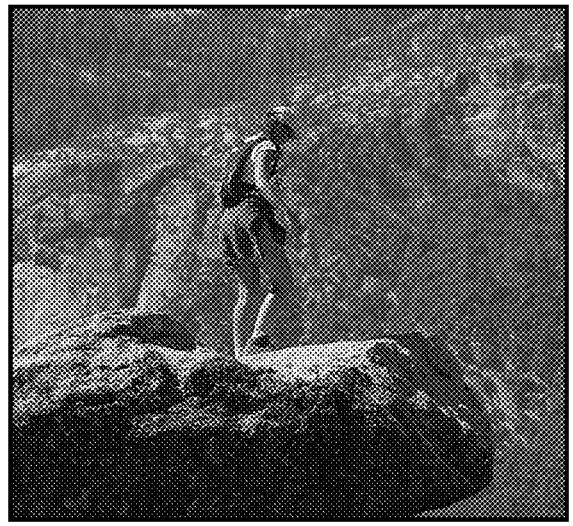
FIG. 8C is a conceptual view of associated with the scene shown within FIG. 8A and showing some coordinate frames.
Figure 8C:
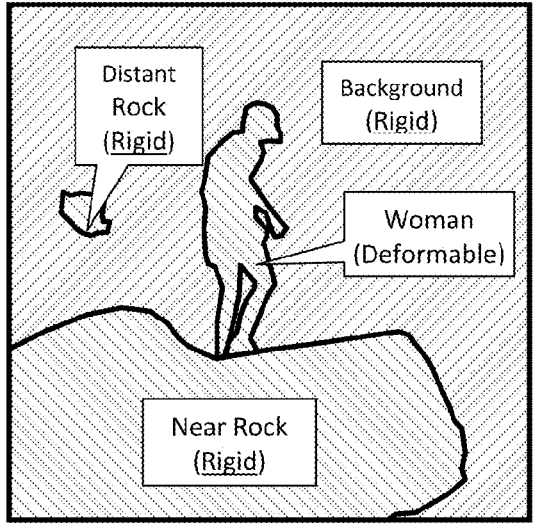
Figure 8C:
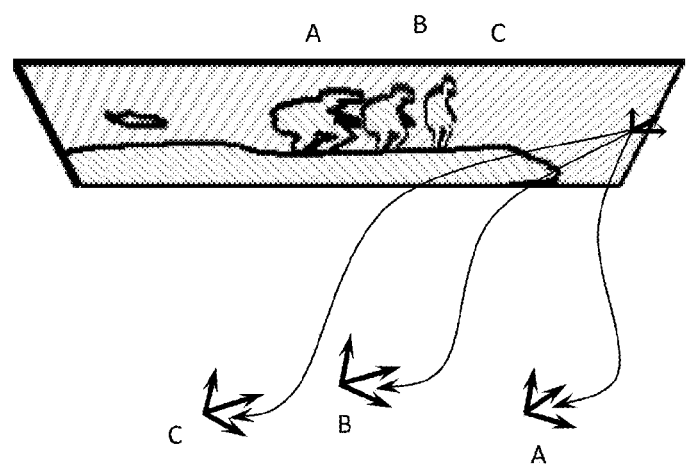

Referring to the FIGS. 8A, 8B, and 8C, relative motion could be caused, for example, by transporting the camera 401 from the photographers right to left. The relative motion could also be caused as the women standing on the precipice walks to the right and stands more erect. Or the motion could be some combination of camera 401 motion relative to the earth and motion of the woman relative to the precipice.

The various types of relative motion are detectable by the camera 401 and can be used to refine the segmentation of surfaces 405 into various categories, for example: rigid (e.g. a rock) and stationary (relative to some reference frame such as the earth); rigid and moving; deforming in shape (e.g. a human being), deforming in size (e.g. a balloon). Note, for example, that the normal vectors associated with surface elements 407 belong to a surface 405 that is rigid (whether moving or not) will all rotate in a nominally identical manner (whether or not the camera is moving). Since rotation of the camera is sensed by the location sensing means 417 rigid rotation of surfaces can be distinguished from camera 405 rotation. The normal vectors that are associated with deformable surfaces reorient as the shape of the deforming surface changes.

Utilizing the states of normal vectors included in a 3D surface, it can be determined whether or not the state is consistent with the current state of the scene model.

3D surfaces are sets of adjacent surface elements that behave in accordance with the morphology: rigid, deformable or particle.

A rigid morphology is used for rigid bodies, which may or may not be moving.

A deformable model is one that is experiencing changing shape or size and there is some set of constraints that cause the surface elements to move in some correlated deterministic manner.

A particle model is used to represent certain phenomena like smoke, water, and grass. There are some constraints that cause the surface element to move in a correlated manner, but it is treated as having some random properties.

The 3D surface associated with a bird, for example, that is still during the initialization step, but begins to fly thereafter, would be initially classified to be rigid, but thereafter would be represented as a deformable model.

Referring to FIG. 8C, a weighted least squares bundle adjustment technique is used to accomplish the simultaneous shape, size, and location of the one or more 3D surfaces 405 in a coordinate frame network as suggested by FIG. 8C. It is to be appreciated that other methods of shape similarity can be used including Boolean occupancy criteria using solid models.

Multiple Scattering Modalities.

It is to be appreciated that the electromagnetic energy 403 emanating from a surface element 407 can be generated and/or influenced by many physical phenomena including radiation, reflection, refraction, and scattering, which are described in the literature including the cited references. As appropriate, the spatio-temporal orientation determining means 419 must properly account for a plurality of such phenomena, including specular reflection, diffuse reflection, diffuse reflection due to subsurface penetration, diffuse reflection due to micro facets, diffuse reflection due to surface roughness and retro-reflective reflection. It is to be appreciated that the uncertainty of the determined orientations will vary as a function of such things as angle (the zenith angle between the surface element normal and the 3D thermal camera axis), the nature of the interaction of the electromagnetic energy and the surface element and the signal to noise ration of the electromagnetic energy returned to the 3D Visualization System. These uncertainties can be determined and used as appropriate to suppress orientations when uncertainties are below predetermined levels, to determine 3D scene models in an optimum sense when redundant data are available, and to actively guide 3D thermal camera operators to perfect 3D scene models by capturing addition 3D video data to improve the uncertainty of areas of the surface.

Multiple Morphologies.

The 3D scene modeling process is schematically described in FIG. 6. By configuration, we mean the location, shape, and/or size of the 3D surfaces relative to the camera 401. A 3D surface 405, is a section of a real watertight surface for which a set of orientations can be integrated.

A minimum energy deformable model is an example of a representation used by the camera 401. It is to be understood that there are other techniques know to those skilled in the art including: principal component analysis (PCA), probabilistic graphical methods making use of Bayesian and Markov network formalisms, non-rigid iterative closest point, skeletonization (medial axis), Octrees, least-squares optimization, 3D morphable models, 3D forward and inverse kinematics, shape interpolation, and basis functions.

Reflectance Field.

One or more reflectance properties from one or more angles are stored in the 3D scene model 427.

It is to be appreciated that the spatial integration and segmentation process can be a massively parallel process using, for example, GPUs or DSPs to process subgroups of pixels before combining results into a single image.

If no relative motion occurs between the camera 401 and the one or more surfaces 405, subsequent frames of sensed characteristics 444 are averaged.

Solid Modeling.

It is to be appreciated that solid models including octree models are particularly good way to represent the 3D surfaces 405. Solid models are fully 3D. Full 3D model, readily refined, can determine occupancy on a probabilistic basis, hierarchical, and spatially sorted, enabling compact storage and efficient refinement.

Electromagnetic Energy

The first embodiment 3D thermal camera is a passive device, meaning that it does not emit its own illumination. Rather randomly polarized infrared electromagnetic energy is emitted by the objects being imaged by the camera 401 and is sensed by the phase characteristic sensing means 411.

It is to be appreciated that electromagnetic energy 403 used by the 3D thermal camera 401 to create the 3D scene model 427 in other embodiments is not restricted to the IR spectrum. The phase characteristic sensing means 411 will function in all regions of the electromagnetic spectrum including the microwave, infrared, visible, ultraviolet, and x-ray regions. The different ways that electromagnetic energy 403 at various wavelengths interacts with matter makes it advantageous to use electromagnetic energy at specific wavelengths for specific applications. For example, phase characteristic sensing in the far infrared spectrum where surfaces radiate naturally (blackbody radiation) enables completely passive operation (no active illumination) of the 3D thermal camera during the day or night. Sensing in the visible spectrum enables completely passive operation (no active illumination) of the 3D thermal camera during the day. Sensing in the mid IR region enables 3D night vision. Sensing in the terahertz region allows the 3D thermal camera to "see through" clothing in 3D. Sensing in the ultraviolet region enables ultra-high resolution modeling. Sensing in the x-ray region enables bones and internal surfaces to be three-dimensionally imaged.

Foreoptics

Figure 5A:
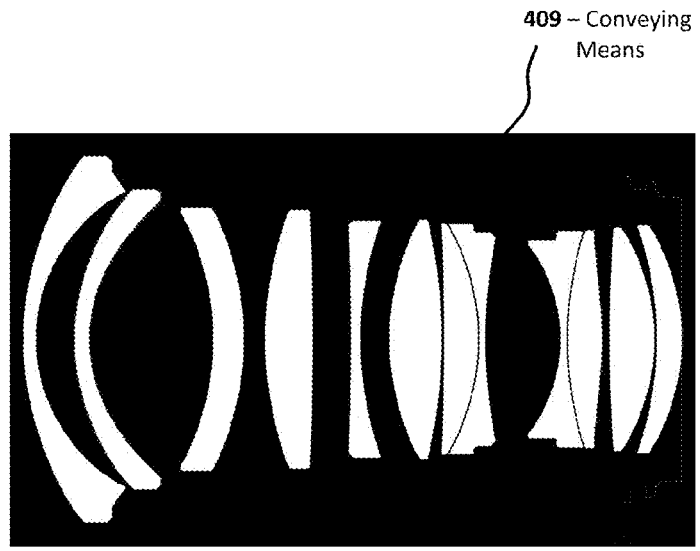
FIG. 5A is an example of an optical system that may be used with a 3D camera with spatial phase characteristic sensing means.

The first embodiment 3D thermal camera 401 utilizes a commercial off the shelf (COTS) thermal lens similar to that depicted in FIG. 5A to convey electromagnetic (EM) energy 403A emanating from surface element 407 of surface 405 and electromagnetic energy 403B emanating from spatial phase characteristic tag 425 on surface 405 to the sensing means 443, which includes spatial phase characteristic sensing means 453, which includes Spatial Phase Characteristic Sensing Components 411, which is a micropolarizing array 449.

It is to be appreciated that in other embodiments other arrangements of foreoptic components 410 can be utilized to convey electromagnetic energy 403 to the sensing means 443 depending on the specific application. It is to be appreciated that one or more openings (only one opening is shown in FIG. 4A) including one or more elements or no elements (i.e. space) can convey electromagnetic energy 403 to various camera means including sensing means 411 and means for other functions 437. Examples of foreoptic components 410 for conveying electromagnetic energy for 3D Visualization Systems include refractive elements, reflective elements, diffractive elements, lenses, mirrors, catoptric elements, fiber optic elements, micromirror arrays, microlens arrays, baffles, holographic optical elements, diffractive optical elements, and beam steering mechanisms. Two or three laterally located lens elements, for example, might be used to take advantage of multi-camera phenomena such as stereo correspondence. Catoptric elements, for example, might be used to design wide angle conveying means 409 for 3D security cameras approaching a hemisphere. Beam steering mechanisms, for example, might be used to expand the camera 401 field of view even further. Microlens arrays, for example, might be used to take advantage of numerical imaging phenomena such as super-resolution, greater depth of field, greater dynamic range, and depth estimation.

Spatial Phase Characteristic Sensing

The net electric field vector associated with a beam of electromagnetic (EM) energy emanating from a surface element sweeps out an elliptical form in a plane perpendicular to the direction of travel called the polarization ellipse. As this EM wave interacts with various surfaces through emission, transmission, reflection, or absorption, the shape and orientation of the polarization ellipse is affected. By sensing the ellipticity and orientation of the polarization ellipse surface normal orientations can be determined. The shape and orientation of the polarization ellipse can be determined from a set of spatial phase characteristics. The shape, or ellipticity, and is defined in terms of the degree of linear polarization, or DoLP. The orientation of the major axis of the polarization ellipse (not to be confused with the orientation of the normal to a surface element) is defined in terms of Theta, θ, which is the angle of the major axis from the camera X axis projected onto the image plane.

Figure 5B:
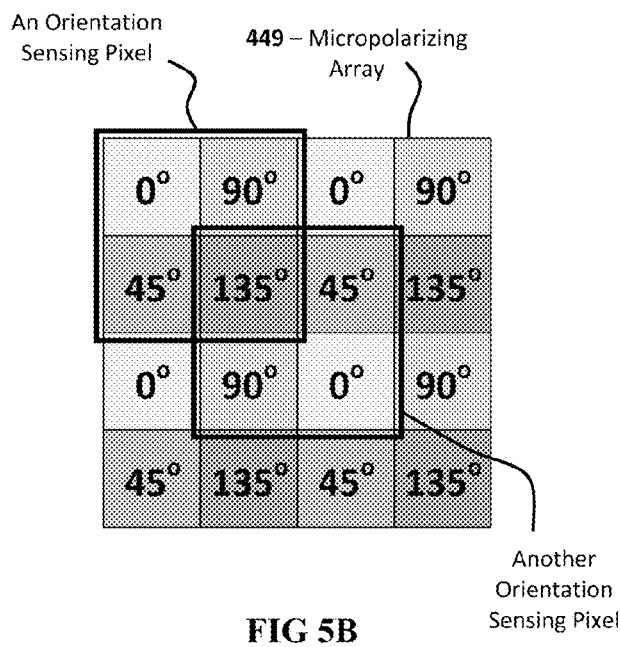
FIG. 5B is a schematic representation of a portion of a micropolarizing array showing arrangements of four subpixels at 0, 45, 90, and 135 degree polarization axis angles and showing two sets of four subpixels each used to sense surface element orientation.

The first embodiment 3D thermal camera 401 includes sensing means 443 shown in FIG. 4A, which includes a spatial phase characteristic sensing means 453 shown in FIG. 4B, which further includes the Spatial Phase Characteristic Sensing Components 411, which in this embodiment is a micropolarizing array 449 shown in FIG. 4B and partially depicted in FIG. 5B. Any three of the four adjacent subpixels shown in FIG. 5B are needed to sense the orientation of a surface element. For simplicity, we will proceed to describe equations assuming that the three pixels in FIG. 5 5B with axis orientations 0 deg, 45 deg, and 90 deg are used to sense the orientation of a surface element. It is to be appreciated that any three of the four adjacent subpixels shown in FIG. 5 5B could be used. Also, a redundant set of four subpixels (or any greater number of subpixels could be used as well.

We introduce, auxiliary variables $(v_1 \ldots v_4)$ which are defined in FIG. 5C and below, where $I_0$ is the intensity detected at the 0 degree subpixel, $I_{45}$ is the intensity detected at the 45 degree subpixel, and so forth $v_1 = I_{90} - I_0$      i.

$v_2 = I_{45} - I_0$      ii.

$v_3 = I_{90} - I_{45}$      iii.

$v_4 = I_{90} + I_0$      iv.

The equations to compute DoLP and Theta from the auxiliary variables are as follows:

$$\theta = -\frac{1}{2}\tan^{-1}\left(\frac{v_2 + v_3}{v_1}\right) \quad \text{i}$$

$$\rho = \frac{\sqrt{v_1^2 + v_2^2 + v_3^2 + 2v_2 v_3}}{v_4} \quad \text{ii}$$

The equations to compute the direction cosigns of the normal vectors at the i,j th pixel, where α, β, and γ are the directional cosines for X, Y, and Z respectively and scale is a function use to compute $$\alpha_{i,j} = a\cos\left(\cos\left(\frac{\pi}{2} - \gamma_{i,j}\right) \cdot \cos\left(\theta_{i,j} - \frac{\pi}{2}\right)\right)$$

$$\beta_{i,j} = a\cos\left(\cos\left(\frac{\pi}{2} - \gamma_{i,j}\right) \cdot \cos(\theta_{i,j})\right)$$

$$\gamma = \text{scale}\left(\text{scale\_DoLP}, 0, \frac{\pi}{2}\right)$$

Once the directional cosines for each pixel are known, the x, y, and z, coordinates for the surface normal at each target/object pixel can be found:

$x_{i,j} = \cos(\alpha_{i,j})$
$y_{i,j} = \cos(\beta_{i,j})$
$z_{i,j} = \cos(\gamma_{i,j})$ Note that since the x, y, and z, values are based on the normalized values of the directional cosines, the resulting 3D object is created in normalized space.

With the directional cosines (and other calculated information) for each target pixel, the 3D surface of the is stitched together using "seed" pixels and surface integration. Seed pixels are predefined pixels set up on a grid basis across the target in the image plane. They are located throughout the overall target grid and make up a small percentage of the overall number of pixels. A sub-mesh build begins with each seed pixel, using the direction cosines to stitch the nearest neighbor pixels together, forming a larger surface. The process is iteratively completed for all seed pixels until the sub-mesh has been completed. Automated algorithms assist in the best placement and concentration of seed pixels to minimize error and computational effort. The result is a 3D scene model of the imaged object yielding geometric sizes and shapes.

It is evident that when the surface 405 has low polarization, the unpolarized component of light contributes a significant amount to the image intensities. Due to A-D conversion and quantization effects, this makes extracting polarization information extremely difficult. This problem can be solved by performing on-chip subtraction, and taking multiple exposures in conjunction with a high-bit resolution sensor.

Figure 5C:
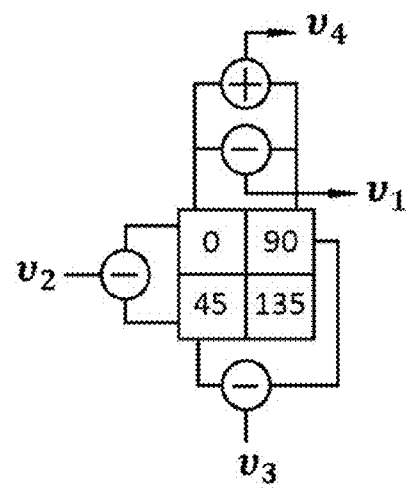
FIG. 5C is a schematic used to define terms used in the on-chip subtraction algorithm used with a 3D camera with spatial phase characteristic sensing means.

FIGS. 5A, 5B, and 5C represent an example of one optical arrangement that provides a 3D thermal camera 401 with a means of phase characteristic sensing 411. It is to be appreciated that the example suggested by FIGS. 5A, 5B, and 5C is not a limitation of the subject invention, but is merely one of many embodiments of a means of phase characteristic sensing 411. The means for sensing a spatial phase characteristic 411 can be implemented using, for example, one or more focal plane arrays, direct image sensors, an active pixel sensors, delta-sigma converters, multi-sampling sensors, photon counters, frequency selective surfaces, plasmonic crystals, micropolarizer arrays, quantum dots, form birefringents, an antenna-coupled metal-oxide-metal diodes, liquid crystals, nematic liquid crystals, ferroelectric liquid crystals, linear polarizers, wave plates, beam splitters, or light emitting diodes.

It is to be appreciated that the circular polarization characteristic is not required when the camera 401 is used to image most natural surfaces, since most natural surfaces do not cause electromagnetic energy to become circularly polarized.

Dynamic Range Enhancement.

The first embodiment 3D thermal camera 401 utilizes the novel subtractive method described above implemented on-chip to improve the dynamic range of the detection process. It is to be appreciated that other approaches can be used in combination with this subtractive method including one of an active pixel sensor or a delta-sigma converter.

Location Sensing

The first embodiment 3D thermal camera 401 depicted in FIGS. 4A and 4B incorporates a six axis accelerometer 447 (three linear displacements, three rotational displacements) which is used in conjunction with the spatial phase characteristic sensing means 453 to estimate the location of the camera 401. It is to be appreciated that many different types of pose sensing methods could be used to sense location characteristics any one of which might be preferred depending on the application. Location sensing devices might include: global positioning system (GPS), differential GPS, gravitational sensors, laser trackers, laser scanners, acoustic position trackers, magnetic position trackers, motion capture systems, optical position trackers, radio frequency identification (RFID) trackers, linear encoders and angular encoders.

Spectral Sensing

The first embodiment 3D thermal camera 401 does not include spectral sensing means 413. However, it is to be appreciated that spectral detectors of many sorts can be included in 3D visualization systems to address other applications. For example, sensors to capture color can be included when visible texture is required. Multi-spectral and hyper-spectral sensors can be included to extract surface characteristic information for purposes of object identification. Contrast texture enabled by spectral sensors can supplement physical texture during the 3D scene modeling process. It is to be appreciated that spectral sensing pixels can located on detectors that are distinct from spatial phase characteristic sensing pixels or can be interspersed with spatial phase pixels in many configurations.

Range Sensing

The first embodiment 3D thermal camera 401 does not include range means 415. However, it is to be appreciated that range detectors of many sorts can be included in 3D visualization systems to address other applications. For example, time of flight (TOF) focal plane arrays can be included in the sensing means 443 to capture ranges from the camera 401 to surface elements 407 on surfaces 405. Other ranging sensors include depth from focus, depth from defocus, stereo correspondence, pulsed TOF, continuous modulation TOF or coherent technologies, acoustic or electromagnetic energy, and spot, line or no scanning systems (e.g. focal plane arrays). It is to be appreciated that range sensing pixels can located on detectors that are distinct from spatial phase characteristic sensing pixels or can be interspersed with spatial phase pixels in many configurations.

3D Display

The first embodiment camera 401 includes an on-board, monocular (one eye) 2D display which is utilized to render the 3D scene model 427 in real-time. The 3D scene model 427 is typically rendered from the point of view of the camera 401. Small perturbations in rendered viewing angle are utilized at operator option, for example, to achieve three-dimensional effects such as wiggle stereoscopy. Wiggle stereoscopy generates a monocular 3D effect by alternating between two slightly displaced views of the same scene. And large perturbations in rendered viewing angle are utilized in a non-real-time mode to, for example, enable the 3D scene model 427 to be viewed historically. Because the frequency of the electromagnetic energy 403 used by the spatial phase characteristic sensing means 453 is thermal (infrared energy below the visible band), the 3D scene model 427 must be rendered in such a way that it will be correctly perceived by the camera operator to be a dynamic 3D scene (obviously using visible light). Monocular depth cues inherent in the sensed 3D scene model 427 of the one of more surfaces 405 include perspective, motion parallax, kinetic depth perception, texture gradient, occlusion, relative size, and familiar size. Monocular depth cues that are synthesized by the camera 401 at the option of the operator include lighting, shading, aerial perspective, and enhancement of any of the previously mentioned inherent cues. Lighting, shading, and aerial perspective all must be entirely synthesized since they are not sensed at thermal frequencies. The inherent depth cues can be modified to enhance the operator's sense of three-dimensionality by altering the rendering process. For example, perspective could be exaggerated to make perspective more or less extreme.

It is to be appreciated that in other embodiments synthesized binocular depth cues could be used by binocular, stereoscopic or other non-conventional display means 435 to further enhance the sense of three-dimensionality experienced by human observers of the display. Binocular depth cues include stereopsis and convergence.

It is to be appreciated that image compression 439A and decompression 439B could be used in other embodiments to reduce the number of bits of information traveling over the data transmission channel between the 3D scene modeling means 427 and the display means 437. The compression can be lossy or lossless; intraframe (spatial), interframe (temporal) or model-based depending on the particular application.

It is to be appreciated that real-time head tracking could be used by other embodiments to create a synthetic motion parallax depth cue on a conventional display.

Tag Reading

The first embodiment camera 401 includes a tag reading means 423 for reading tags 425 applied to a 3D surface 405. The tags 425 utilize oriented materials which interact with electromagnetic energy 403B to affect its spatial phase characteristics, thereby encoding information that can be sensed by sensing means 443 including Spatial Phase Characteristic Sensing Means 453. Information is represented on the surface 405 in terms of presence or absence of material or in terms of one or more angles that can be determined by the camera 401.

Figure 9:
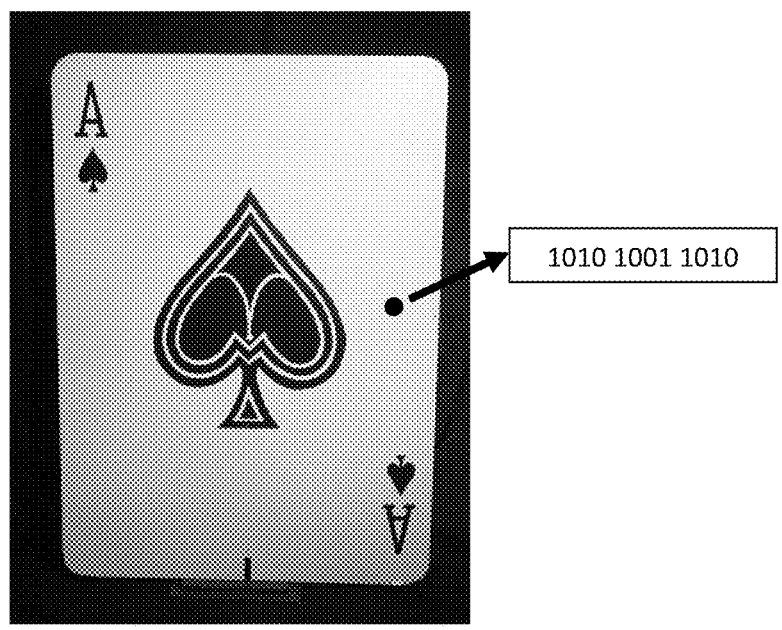
FIG. 9 is a photograph of a playing card showing, in false color, a spatial phase characteristic tag.

Tags can be made to be invisible to the eye. FIG. 9 depicts using false color black the use of an invisible tag 425 on a playing card.

Figure 10:
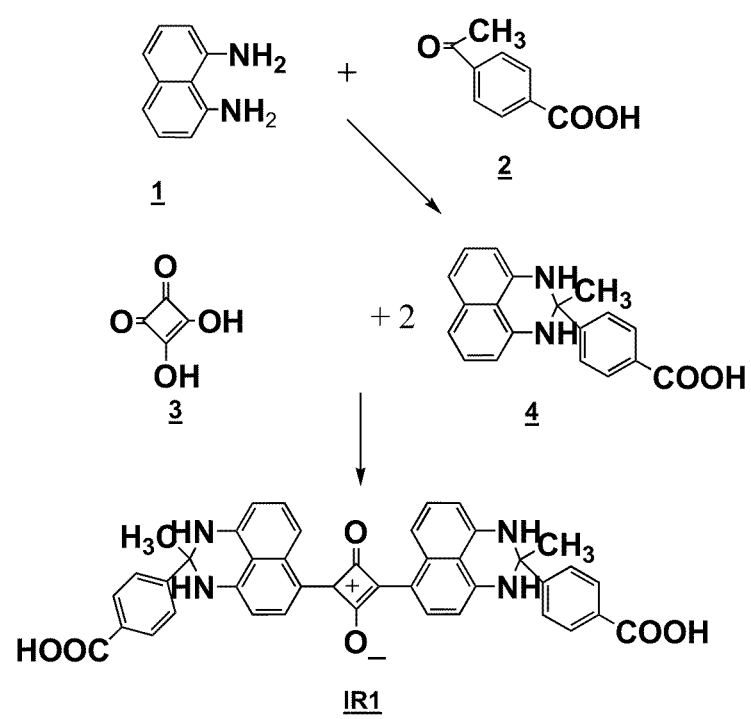
FIG. 10 is a diagram which illustrates the sequence of reactions used to prepare taggant IRI.

The first embodiment camera 401 employs a clear optical tag that is 0.001 inches thick with a clear IR dichroic dye. The thin film uses an optically clear laminating adhesive material that is laminated onto stretched PVA. FIG. 10 illustrates a sequence of reactions used to prepare a dye labeled "IR1" 999 that is used to create tags 425.

It is to be appreciated that tagging materials can be liquids and thin film taggant compounds, in various tinted transparent forms. Materials which could be used include elongated paint dyes, polyvinyl alcohol (PVA), nanotubes, clusters of quantum dots, and liquid crystal solutions that are uniquely oriented. Nylon thread can be coated with liquid crystals, thus creating a tagging thread which could be woven into the fabric, or perhaps be the fabric. Tags could be delivered according to methods including: Self-orienting liquid in an aerosol or liquid delivery. Use molecular-level orientation for liquid crystals or graphite nanotubes. Each of these has an aspect ratio greater than 10:1 and possesses a charge, which makes them orient. Macroscale particles which orient themselves in unique patterns on the target. These would be larger particles on the order of a mm or greater in size that can be shot or projected onto the target. Each particle will have its own orientation and together they will make up a unique signature.

It is to be appreciated that taggants can blend very well with their backgrounds and be nearly impossible to detect with the unaided eye or conventional sensors.

Other Functions

The first embodiment camera 401 includes means for other functions 437 including saving the 3D scene model to disk. It is to be appreciated that means for many other functions might be included in the first embodiment camera 401, depending on the applications, including one of automatic audio, manual audio, autofocus, manual focus, automatic exposure, manual exposure, automatic white balance, manual white balance, headphone jack, external microphone, filter rings, lens adapters, digital zoom, optical zoom, playback and record controls, rechargeable batteries, synchronization with other the apparatus, and image stabilization.

Other Aspects

In one specific example, the system further includes means for extracting information about of the 3D surfaces using the 3D scene model, thereby creating real-time information about the 3D surfaces.

In another specific example, the system further includes means for refining the 3D scene model by communicating with an operator or an automated control system to locate the system at one or more desired locations.

In another specific example, the information extracted by the means for extracting real-time information is one or more of a 3D video, a compressed 3D video, a noise suppressed 3D video, a route, a descriptions, an anomaly, a change, a feature, a shape, sizes, poses, dimensions, motions, speeds, velocities, accelerations, expressions, gestures, emotions, deception, postures, activities, behaviors, faces, lips, ears, eyes; irises, veins, moles, wounds, birthmarks, freckles, scars, wrinkles, fingerprints, thumbprints, palm prints, warts, categories, identities, instances, surfaces of internal organs, breasts, skin tumors, skin cancers, dysmorphologies, abnormalities, teeth, gums, facial expressions, facial macro expressions, facial micro expressions, facial subtle expressions, head gestures, hand gestures, arm gestures, gaits, body gestures, wagging tails, athletic motions, fighting positions, lip reading, crawling, talking, screaming, barking, breathing, running, galloping, eating, gun raising, axe swinging, phone talking, guitar playing, crowd behavior, health, mental state, range of motion, performance, weight, volume and concealed objects.

Closing

While the invention has been described above and illustrated with reference to certain embodiments of the invention, it is to be understood that the invention is not so limited. Modifications and alterations will occur to others upon a reading and understanding of the specification, including the drawings. In any event, the invention covers and includes any and all modifications and variations to the embodiments that have been described and that are encompassed by the following claims.

What is claimed is:

1. A real-time 3D visualization system included in a real 3D scene, the scene includes one or more moving surfaces and electromagnetic energy, the energy scatters from the surfaces, the system includes:
    a. means for conveying energy, the energy is received from the surfaces,
    b. means for sensing at video sampling rates a plurality of polarization characteristics of the energy, thereby creating sensed data, the energy is received from the means for conveying,
    c. means for modeling one or more surface elements, thereby creating a scene model, the means for modeling uses sensed data, the surface elements represent one or more regions on the surfaces, the means for modeling further includes means for modeling changing polarization of the energy as it interacts with the surface elements in a plurality of scattering modes from a plurality of directions at a plurality of times, and
    d. means for displaying the scene in real-time, thereby evoking a 3D notion of the scene, the means for displaying uses the scene model, the means for displaying further includes means for displaying a plurality of depth cues.

2. The system of claim 1 wherein the means for modeling further includes means to represent the surface elements in one or more of the following morphologies: rigid, deformable and particle.

3. The system of claim 1 wherein the scene model is solid, spatially sorted and hierarchical.

4. The system of claim 1 wherein the means for conveying includes one or more of a refractive element, a reflective element, a diffractive element, a lens, a mirror, a fiber optic element, a microlens array, a baffle, a micromirror array, a catoptric element, a holographic optical element, a diffractive optical element, a beam steering mechanism, an element including metamaterials or an element including birefringents.

5. The system of claim 1 wherein the means for sensing includes one or more of a focal plane array, a direct image sensor, a multi-sampling sensor, a photon counter, a frequency selective surface, a plasmonic crystal, a micropolarizer array, quantum dots, a form birefringent, an antenna-coupled metal-oxide-metal diode, a liquid crystal, a nematic liquid crystal, a ferroelectric liquid crystal, a linear polarizer, a wave plate, a beam splitter or a light emitting diode.

6. The system of claim 1 wherein the means for sensing includes one or more on-chip means to increase dynamic range, including one or more of an active pixel sensor, a delta-sigma converter and a subtraction technique under which sets of adjacent pixels are subtracted to form auxiliary on-chip differences that can be used to compute the orientations of surface elements.

7. The system of claim 1 which further includes means for sensing one or more spectral characteristics of the electromagnetic energy in one or more spectral bands, the means for modeling utilizing the spectral characteristics.

8. The system of claim 1 which further includes means for sensing one or more range characteristics to the surfaces, the means for modeling utilizing the range characteristics.

9. The system of claim 1 which further includes means for sensing one or more location characteristics of the system or the surfaces, the means for modeling utilizing the location characteristics.

10. The system of claim 1 wherein the plurality of scattering modes includes at least two of specular reflection, diffuse reflection, micro facet reflection, retro-reflection, transmission and emission.

11. The system of claim 1 which further includes means for determining from a plurality of polarization characteristics one or more of a tag location or information encoded into the tag including a 3D image, the means for modeling utilizing the location or the information encoded into the tag.

12. The system of claim 1 wherein means for processing the scene model and means for displaying the scene model includes means for image compression and decompression.

13. The system of claim 1 wherein said means for displaying further includes a means for tracking a display observer's head, the tracking is used to display a motion parallax depth cues.

14. The system of claim 1 which further includes means for providing functionality including one of automatic audio, manual audio, autofocus, manual focus, automatic exposure, manual exposure, automatic white balance, manual white balance, headphone jack, external microphone, filter rings, lens adapters, digital zoom, optical zoom, playback and record controls, rechargeable batteries, synchronization with other the apparatus and image stabilization.

15. The system of claim 1 which further includes means for extracting information about of the surface elements using the scene model, thereby creating real-time information about the surface elements.

16. The system of claim 1 which further includes means for refining the scene model by communicating with an operator or an automated control system to locate the system at one or more desired locations.

17. The system of claim 1 wherein the information extracted by the means for extracting real-time information is one or more of a 3D video, a compressed 3D video, a noise suppressed 3D video, a route, a descriptions, an anomaly, a change, a feature, a shape, sizes, poses, dimensions, motions, speeds, velocities, accelerations, expressions, gestures, emotions, deception, postures, activities, behaviors, faces, lips, ears, eyes, irises, veins, moles, wounds, birthmarks, freckles, scars, wrinkles, fingerprints, thumbprints, palm prints, warts, categories, identities, instances, surfaces of internal organs, breasts, skin tumors, skin cancers, dysmorphologies, abnormalities, teeth, gums, facial expressions, facial macro expressions, facial micro expressions, facial subtle expressions, head gestures, hand gestures, arm gestures, gaits, body gestures, wagging tails, athletic motions, fighting positions, lip reading, crawling, talking, screaming, barking, breathing, running, galloping, eating, gun raising, axe swinging, phone talking, guitar playing, crowd behavior, health, mental state, range of motion, performance, weight, volume and concealed objects.

* * * * *